(12) United States Patent
Morris

(10) Patent No.: US 10,547,895 B1
(45) Date of Patent: Jan. 28, 2020

(54) METHODS, SYSTEMS, AND COMPUTER PROGRAM PRODUCTS FOR CONTROLLING PLAY OF MEDIA STREAMS

(71) Applicant: SITTING MAN, LLC, Raleigh, NC (US)

(72) Inventor: Robert Paul Morris, Raleigh, NC (US)

(73) Assignee: SITTING MAN, LLC, Madison, GA (US)

( * ) Notice: Subject to any disclaimer, the term of this patent is extended or adjusted under 35 U.S.C. 154(b) by 0 days.

(21) Appl. No.: 16/269,522

(22) Filed: Feb. 6, 2019

Related U.S. Application Data

(63) Continuation of application No. 15/694,760, filed on Sep. 1, 2017, now Pat. No. 10,397,639, which is a continuation-in-part of application No. 14/835,662, filed on Aug. 25, 2015, which is a continuation-in-part of application No. 14/604,664, filed on Jan. 23, 2015, now abandoned, which is a continuation-in-part of application No. 12/696,854, (Continued)

(51) Int. Cl.
| | |
|---|---|
| *H04N 21/431* | (2011.01) |
| *G06F 3/0484* | (2013.01) |
| *G11B 27/00* | (2006.01) |
| *G06F 3/00* | (2006.01) |
| *G06F 3/0482* | (2013.01) |
| *H04N 21/4143* | (2011.01) |
| *H04N 21/439* | (2011.01) |
| *H04N 21/443* | (2011.01) |
| *H04N 21/485* | (2011.01) |

(52) U.S. Cl.
CPC ........... *H04N 21/4312* (2013.01); *G06F 3/00* (2013.01); *G06F 3/0482* (2013.01); *G06F 3/04842* (2013.01); *G06F 3/04847* (2013.01); *G11B 27/00* (2013.01); *H04N 21/4143* (2013.01); *H04N 21/4396* (2013.01); *H04N 21/4438* (2013.01); *H04N 21/4852* (2013.01); *H04N 21/4854* (2013.01)

(58) Field of Classification Search
CPC ...... G06F 3/00; G06F 3/0482; G06F 3/04842; G06F 3/04847; G11B 27/00; H04N 21/4312; H04N 21/4143; H04N 21/4396; H04N 21/4438; H04N 21/4852; H04N 21/4854
See application file for complete search history.

(56) References Cited

U.S. PATENT DOCUMENTS

| | | | | |
|---|---|---|---|---|
| 5,995,160 A | * | 11/1999 | Rumreich | H04N 5/45 348/564 |
| 6,437,758 B1 | * | 8/2002 | Nielsen | G06F 3/013 345/7 |

(Continued)

*Primary Examiner* — Huy T Nguyen
(74) *Attorney, Agent, or Firm* — Patrick E. Caldwell, Esq.; The Caldwell Firm, LLC

(57) ABSTRACT

Methods and systems are described for delaying presentation of an update to a user interface. In one aspect, first update information is received for sending to a display device to update a previously updated, existing visual component. A specified visibility condition is detected as not being met. In response to detecting the visibility condition is not met, the sending of the first update information is deferred. The visibility condition is detected as met. In response to detecting the visibility condition is met, the sending of the first update information to update the visual component is performed.

32 Claims, 10 Drawing Sheets

Related U.S. Application Data filed on Jan. 29, 2010, now abandoned, and a continuation-in-part of application No. 12/705,638, filed on Feb. 15, 2010, now abandoned.

(56) References Cited

U.S. PATENT DOCUMENTS

| | | | | |
|---|---|---|---|---|
| 2003/0161612 A1* | 8/2003 | Walls | ........................ | H04N 5/76 386/213 |
| 2008/0155437 A1* | 6/2008 | Morris | .................... | G06F 9/451 715/765 |
| 2012/0260170 A1* | 10/2012 | Bhogal | ............... | H04L 65/4092 715/716 |

* cited by examiner

METHODS, SYSTEMS, AND COMPUTER PROGRAM PRODUCTS FOR CONTROLLING PLAY OF MEDIA STREAMS

RELATED APPLICATIONS

This application is a continuation of U.S. patent application Ser. No. 15/694,760, entitled "METHODS, SYSTEMS, AND COMPUTER PROGRAM PRODUCTS FOR CONTROLLING PLAY OF MEDIA STREAMS," filed Sep. 1, 2017, which is a continuation-in-part of, and claims priority to U.S. patent application Ser. No. 14/835,662, entitled "METHODS, SYSTEMS, AND COMPUTER PROGRAM PRODUCTS FOR CONTROLLING PLAY OF MEDIA STREAMS," filed Aug. 25, 2015, which is a continuation-in-part of, and claims priority to U.S. patent application Ser. No. 14/604,664, entitled "METHODS, SYSTEMS, AND COMPUTER PROGRAM PRODUCTS FOR CONTROLLING PLAY OF MEDIA STREAMS," filed Jan. 23, 2015, which is a continuation-in-part of, and claims priority to: 1) U.S. patent application Ser. No. 12/696,854, entitled "METHODS, SYSTEMS, AND COMPUTER PROGRAM PRODUCTS FOR CONTROLLING PLAY OF MEDIA STREAMS," filed Jan. 29, 2010; and 2) U.S. patent application Ser. No. 12/705,638, entitled "METHODS, SYSTEMS, AND COMPUTER PROGRAM PRODUCTS FOR DELAYING PRESENTATION OF AN UPDATE TO A USER INTERFACE," filed Feb. 15, 2010.

APPLICATIONS INCORPORATED BY REFERENCE

U.S. patent application Ser. No. 12/705,638, entitled "METHODS, SYSTEMS, AND COMPUTER PROGRAM PRODUCTS FOR DELAYING PRESENTATION OF AN UPDATE TO A USER INTERFACE," filed Feb. 15, 2010, incorporates by reference U.S. patent application Ser. No. 12/696,854, entitled "METHODS, SYSTEMS, AND COMPUTER PROGRAM PRODUCTS FOR CONTROLLING PLAY OF MEDIA STREAMS," filed Jan. 29, 2010; and U.S. patent application Ser. No. 12/691,042 filed on Jan. 21, 2010 entitled "METHODS, SYSTEMS, AND COMPUTER PROGRAM PRODUCTS FOR COORDINATING PLAYING OF MEDIA STREAMS. The following are each incorporated herein by reference in their entirety for all purposes: U.S. patent application Ser. No. 12/696,854 (US 2011-0191677 A1), entitled "METHODS, SYSTEMS, AND COMPUTER PROGRAM PRODUCTS FOR CONTROLLING PLAY OF MEDIA STREAMS," filed Jan. 29, 2010; U.S. patent application Ser. No. 12/691,042 (US 2011-0176790 A1) filed on Jan. 21, 2010 entitled "METHODS, SYSTEMS, AND COMPUTER PROGRAM PRODUCTS FOR COORDINATING PLAYING OF MEDIA STREAMS"; and U.S. patent application Ser. No. 12/705,638 (US 2011-0202843 A1), entitled "METHODS, SYSTEMS, AND COMPUTER PROGRAM PRODUCTS FOR DELAYING PRESENTATION OF AN UPDATE TO A USER INTERFACE," filed Feb. 15, 2010.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and systems are described for delaying presentation of an update to a user interface. In one aspect, the method includes receiving first update information for sending to a display device to update a previously updated, existing visual component. The method further includes detecting that a specified visibility condition associated with the visual component is not met. The method still further includes, in response to detecting the visibility condition is not met, deferring the sending. The method also includes detecting the visibility condition is met. The method additionally includes, in response to detecting the visibility condition is met, performing the sending to update the visual component Further, a system for delaying presentation of an update to a user interface is described. The system includes an execution environment including an instruction processing unit configured to process an instruction included in at least one of an update mediator component, a visibility monitor component, a pause component, and an update director component. The system includes the update mediator component configured for receiving first update information for sending to a display device to update a previously updated, existing visual component. The system further includes the visibility monitor component configured for detecting that a specified visibility condition associated with the visual component is not met. The system still further includes the pause component configured for, in response to detecting the visibility condition is not met, deferring the sending. The system also includes the visibility monitor component configured for detecting the visibility condition is met. The system additionally includes the update director component configured for, in response to detecting the visibility condition is met, performing the sending to update the visual component.

In additional embodiments, Methods, computer programs, and apparatuses/systems are described for: receiving first update information representing a media stream for sending to a display device to update a previously updated, existing visual component of a graphical user interface that includes at least a portion of the media stream; detecting that a specified visibility condition associated with the visual component of the graphical user interface is not met; in response to detecting that the visibility condition is not met, deferring the sending of the first update information representing the media stream to defer the update of the previously updated, existing visual component of the graphical user interface that includes the at least portion of the media stream; detecting that the visibility condition is met; and in response to detecting that the visibility condition is met, performing the sending of the first update information representing the media stream to update the previously updated, existing visual component of the graphical user interface that includes the at least portion of the media stream.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which.

DETAILED DESCRIPTION

Figure 1:
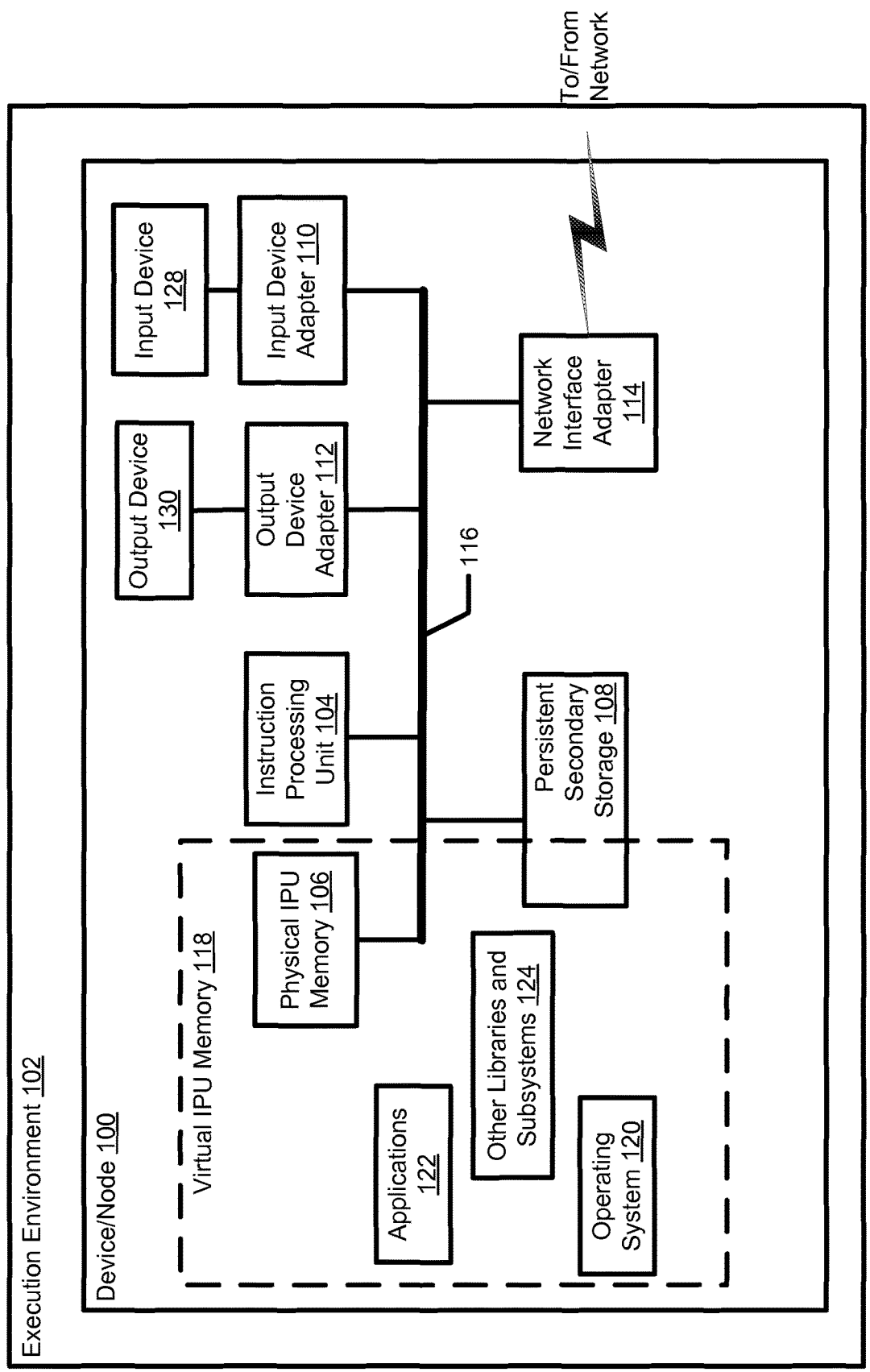
FIG. 1 is a block diagram illustrating an exemplary hardware device included in and/or otherwise providing an execution environment in which the subject matter may be implemented.

An exemplary device included in an execution environment that may be configured according to the subject matter is illustrated in FIG. 1. An execution environment includes an arrangement of hardware and, optionally, software that may be further configured to include an arrangement of components for performing a method of the subject matter described herein.

An execution environment includes or is otherwise provided by a single device or multiple devices. An execution environment may include a virtual execution environment including software components operating in a host execution environment. Exemplary devices included in or otherwise providing suitable execution environments for configuring according to the subject matter include personal computers, notebook computers, tablet computers, servers, hand-held and other mobile devices, multiprocessor devices, distributed devices, consumer electronic devices, and network-enabled devices, referred to herein as nodes, such as nodes with routing and/or switching capabilities. Those skilled in the art will understand that the components illustrated in FIG. 1 are exemplary and may vary by particular execution environment FIG. 1 illustrates hardware device 100 included in execution environment 102. Device 100 includes instruction processing unit (IPU) 104, such as one or more microprocessors; physical IPU memory 106 including storage locations identified by addresses in a physical address space of IPU 104; persistent secondary storage 108 such as one or more hard drives and/or flash storage media; input device adapter 110 such as key or keypad hardware, keyboard adapter, and/or mouse adapter; an output device adapter 112 such as a display or audio adapter for presenting information to a user; a network interface, illustrated by network interface adapter 114, for communicating via a network such as a LAN and/or WAN; and a communication mechanism that couples elements 104-114, illustrated as bus 116.

Elements 104-114 may be operatively coupled by various means. Bus 116 may comprise any type of bus architecture, including a memory bus, a peripheral bus, a local bus, and/or a switching fabric.

IPU 104 is an instruction execution machine, apparatus, or device. Exemplary IPUs include one or more microprocessors, digital signal processors (DSP), graphics processing units (GPU), application-specific integrated circuits (ASIC), and/or field programmable gate arrays (FPGA).

IPU 104 may access machine code instructions and data via one or more memory address spaces in an address space in addition to the physical memory address space. A memory address space includes addresses identifying locations in an IPU memory. IPU 104 may have more than one IPU memory and thus more than one memory address space. IPU 104 may access a location in an IPU memory by processing an address identifying the memory location. The processed address may be in an operand of a machine code instruction and/or may be identified in a register or other hardware of IPU 104.

FIG. 1 illustrates virtual IPU memory 118 spanning at least part of physical IPU memory 106 and at least part of persistent secondary storage 108. Virtual memory addresses in a memory address space may be mapped to physical memory addresses identifying locations in physical IPU memory 106. An address space for identifying locations in a virtual IPU memory is referred to as a virtual address space; its addresses are referred to as virtual memory addresses; and its IPU memory is known as a virtual IPU memory. The term IPU memory may refer to physical IPU memory 106 and/or virtual IPU memory 118 depending on the context in which the term is used as FIG. 1 illustrates.

Various types of memory technologies may be included in physical IPU memory 106. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), and/or RAM-BUS DRAM (RDRAM). Physical IPU memory 106 may include volatile memory as illustrated in the previous sentence and/or may include nonvolatile memory such as nonvolatile flash RAM (NVRAM) and/or ROM.

Secondary storage 108 may include one or more flash memory data storage devices, one or more hard disk drives, one more magnetic disk drives, and/or one or more optical disk drives. Persistent secondary storage may include removable media. The drives and their associated computer-readable storage media provide volatile and/or nonvolatile storage of computer readable instructions, data structures, program components, and other data for execution environment 102.

Execution environment 102 may include software components stored in persistent secondary storage 108, remote storage accessible via a network, and/or in IPU memory 106, 118. FIG. 1 illustrates execution environment 102 including operating system 120, one or more applications 122, other program code and/or data components illustrated by other libraries and subsystems 124.

Execution environment 102 may receive user-provided information via one or more input devices illustrated by input device 128. Input device 128 provides input information to other components in execution environment 102 via input device adapter 110. Execution environment 102 may include an input device adapter for a keyboard, a touch screen, a microphone, a joystick, television receiver, a video camera, a still camera, a document scanner, a fax, a phone, a modem, a network adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via communication interfaces such a serial port, a parallel port, and/or a universal serial bus (USB) port. Input device adapter 110 receives input and provides a representation to bus 116 to be received by IPU 104, physical IPU memory 106, and/or other components included in execution environment 102.

Output device 130 in FIG. 1 exemplifies one or more output devices which may be included in and/or external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an output device such as a phone, joy stick, and/or touch screen may also be an input device.

In addition to various types of display devices, exemplary output devices include printers, speakers, tactile output devices such as motion producing devices, and other sense detectable output devices As used herein the term display includes image projection devices.

A device included in or otherwise providing an execution environment may operate in a networked environment communicating with one or more devices (not shown) via one or more network interfaces. The terms communication interface and network interface are used interchangeably. FIG. 1 illustrates network interface adapter 114 as a network interface included in execution environment 102 to operatively couple device 100 to a network. The terms network node and node in this document both refer to a device having a network interface operatively coupled to a network.

Exemplary network interfaces include wireless network adapters and wired network adapters. Exemplary wireless networks include a BLUETOOTH network, a wireless 802.11 network, and/or a wireless telephony network (e.g., a cellular, PCS, CDMA, and/or GSM network). Exemplary wired networks include various types of LAN, WANS, and personal area networks (PANs). Exemplary network adapters for wired networks include Ethernet adapters, Token-ring adapters, FDDI adapters, asynchronous transfer mode (ATM) adapters, and modems of various types. Exemplary networks also include intranets and internets such as the Internet.

Figure 2:
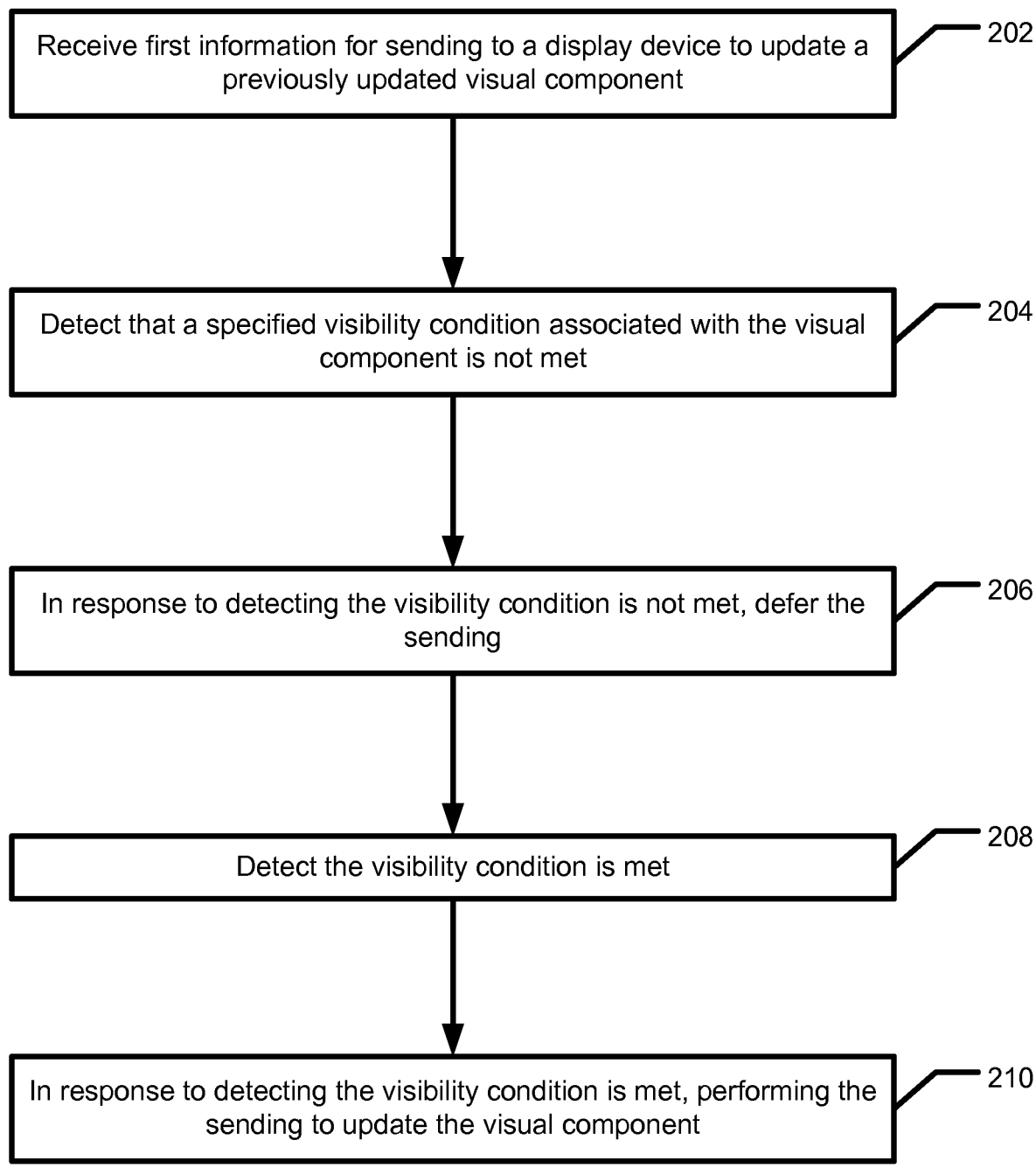
FIG. 2 is a flow diagram illustrating a method for delaying presentation of an update to a user interface according to an aspect of the subject matter described herein.
Figure 3:
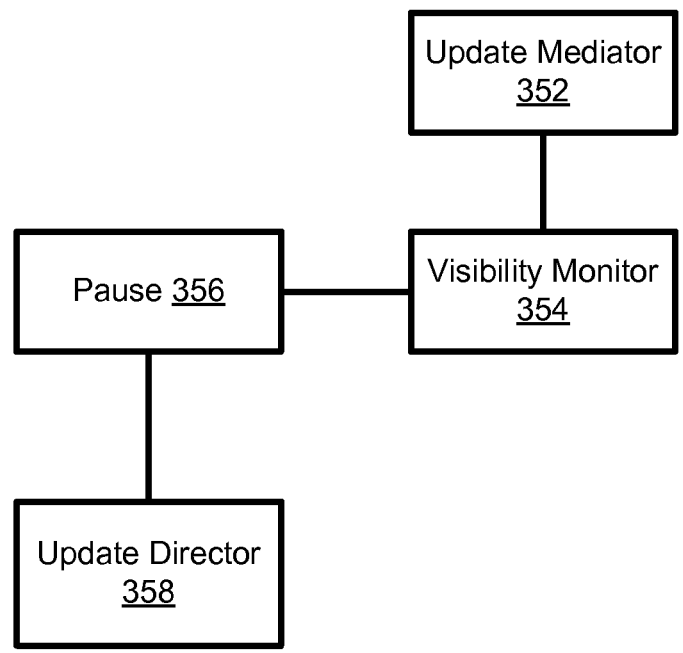
FIG. 3 is block a diagram illustrating an arrangement of components for delaying presentation of an update to a user interface according to another aspect of the subject matter described herein.

FIG. 2 is a flow diagram illustrating a method for delaying presentation of an update to a user interface according to an exemplary aspect of the subject matter described herein. FIG. 3 is a block diagram illustrating a system for delaying presentation of an update to a user interface according to another exemplary aspect of the subject matter described herein. A system for delaying presentation of an update to a user interface includes an execution environment, such as execution environment 102 in FIG. 1, including an instruction processing unit, such as IPU 104, configured to process an instruction included in at least one of an update mediator component 352, a visibility monitor component 354, a pause component 356, and an update director component 358.

The components illustrated in FIG. 3 may be adapted for performing the method illustrated in FIG. 2 in a number of execution environments. Adaptations of the components illustrated in FIG. 3 for performing the method illustrated in FIG. 2 are described operating in exemplary adaptations of execution environment 402 illustrated in FIG. 4*a*, FIG. 4*b*, and also in FIG. 4*c*; and in exemplary execution environment 502 illustrated in FIG. 5.

FIG. 1 illustrates key components of an exemplary device that may at least partially provide and/or otherwise be included in an execution environment, such as those illustrated in FIG. 4*a*, FIG. 4*b*, FIG. 4*c*, and FIG. 5. The components illustrated in FIG. 3, FIG. 4*a*, FIG. 4*b*, FIG. 4*c*, and FIG. 5 may be included in or otherwise combined with the components of FIG. 1 and their analogs to create a variety of arrangements of components according to the subject matter described herein.

Figure 4A:
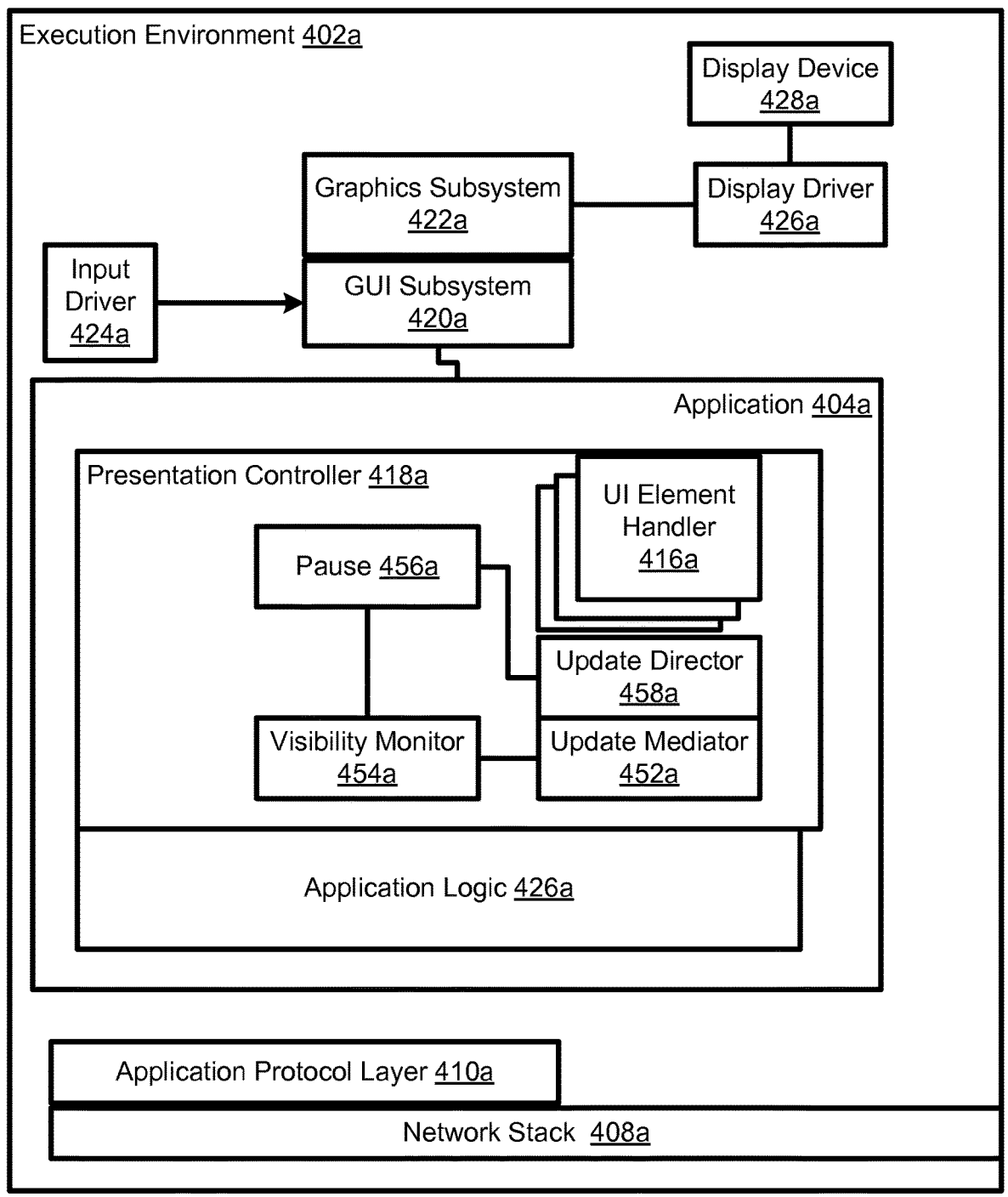
FIG. 4a is a block a diagram illustrating an arrangement of components for delaying presentation of an update to a user interface according to another aspect of the subject matter described herein.
Figure 4B:
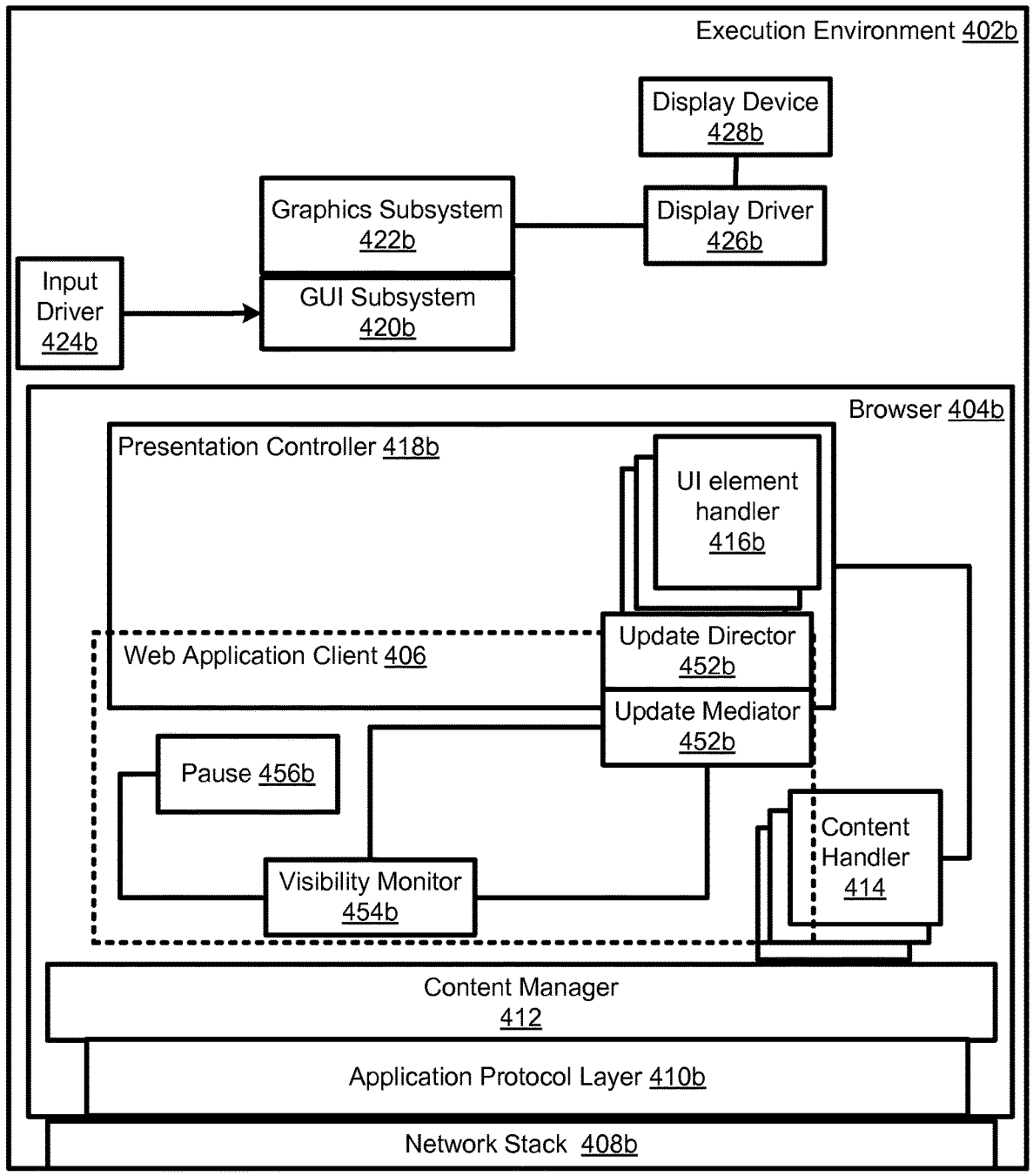
FIG. 4b is a block a diagram illustrating an arrangement of components for delaying presentation of an update to a user interface according to another aspect of the subject matter described herein.
Figure 4C:
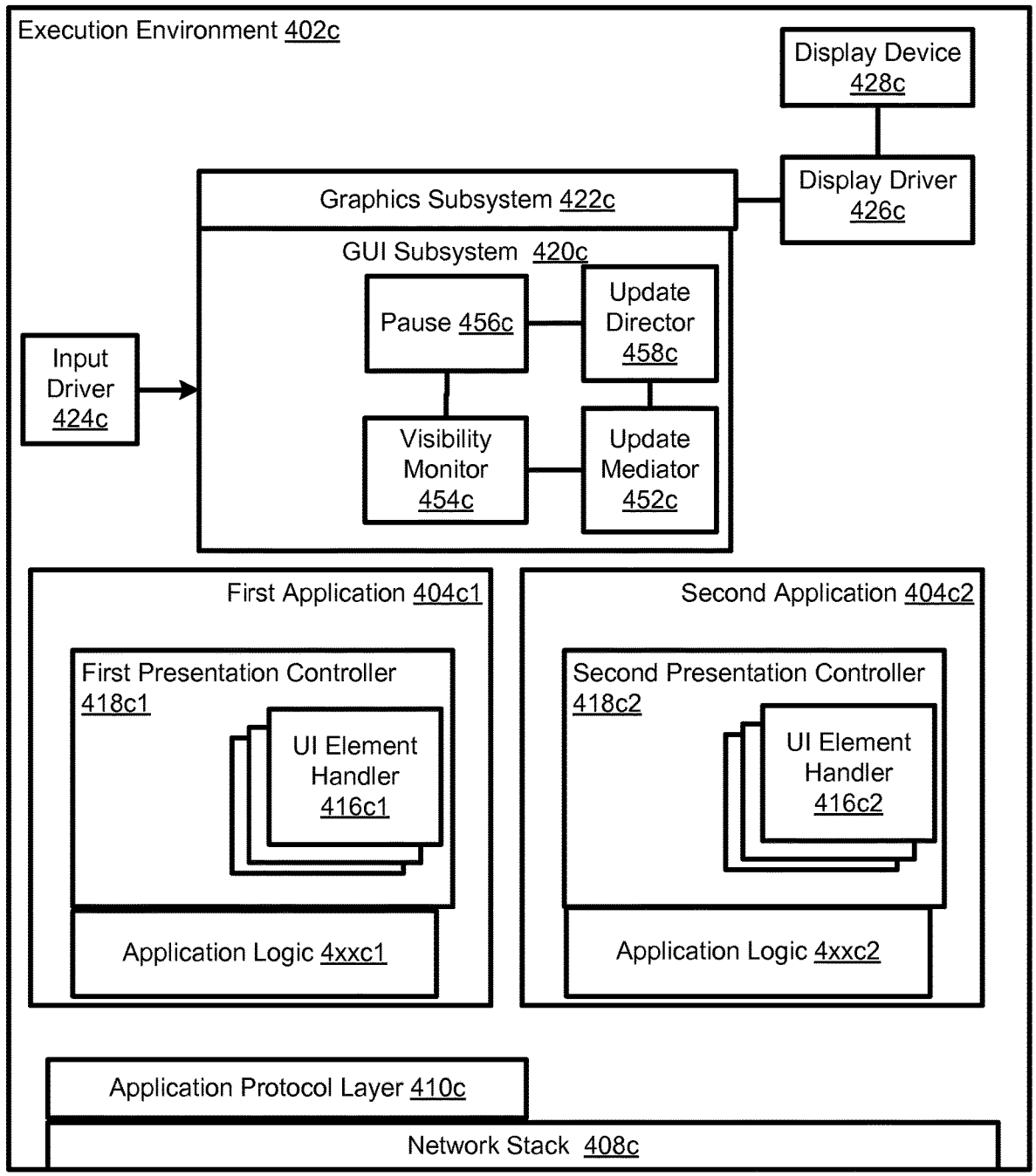
FIG. 4c is a block a diagram illustrating an arrangement of components for delaying presentation of an update to a user interface according to another aspect of the subject matter described herein.
Figure 6:
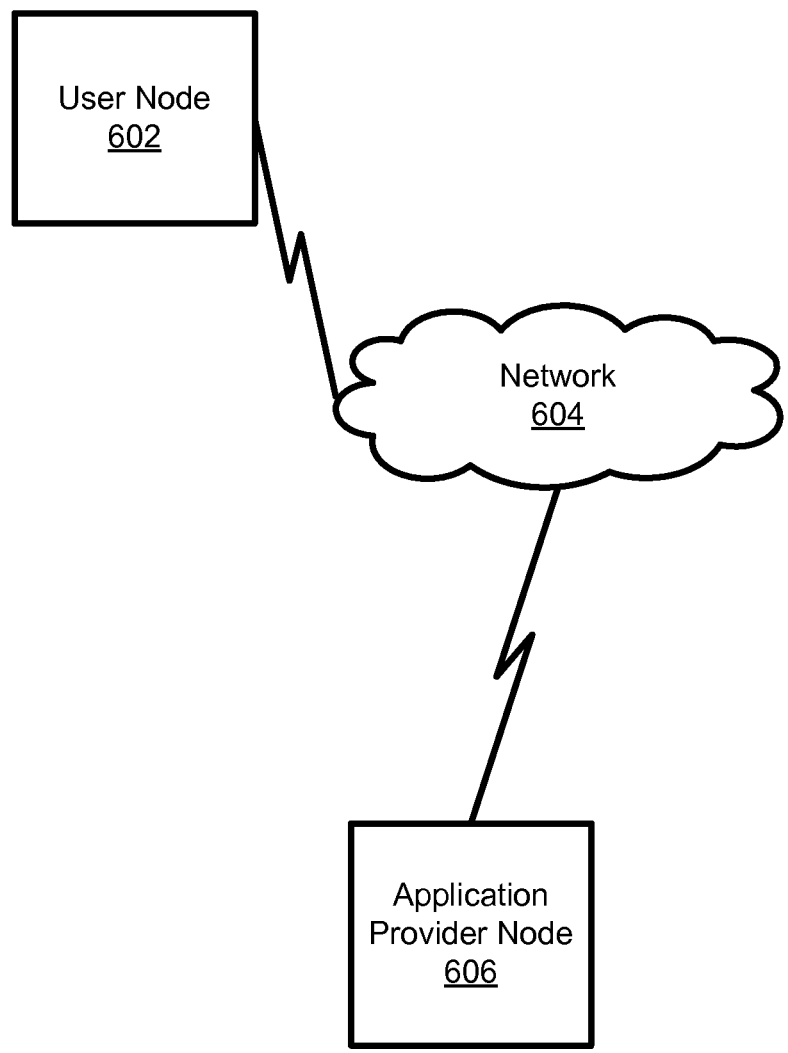
FIG. 6 is a network diagram illustrating an exemplary system for delaying presentation of an update to a user interface according to an aspect of the subject matter described herein.

FIG. 6 illustrates user node 602 as an exemplary device included in and/or otherwise adapted for providing any of execution environments 402 illustrated in FIG. 4*a*, FIG. 4*b*, and FIG. 4*c* each illustrating a different adaptation of the arrangement of components in FIG. 3. As illustrated in FIG. 6, user node 602 is operatively coupled to network 604 via a network interface, such as network interface adapter 114. An adaptation of execution environment 402 may include and/or may otherwise be provided by a device that is not operatively coupled to a network.

In the figures, component identifiers including postfixes with alphabetic characters are used without the postfixes to refer to a group of functionally analogous components collectively and/or generically within a figure and/or across multiple figures when the including description applies to some or all adaptations of the referenced components. For example, execution environment 402*a*, execution environment 402*b*, and execution environment 402*c* may be referred to collectively and/or generically as execution environment 402.

FIG. 4*a* illustrates execution environment 402*a* hosting application 404*a* including an adaptation of the arrangement of components in FIG. 3. FIG. 4*b* illustrates execution environment 402*b* including browser 404*b* application hosting an adaptation of the arrangement of components in FIG. 3 operating in web application client 406 which may be received from a remote application provider, such as web application 504 in FIG. 5. Browser 404*b* and execution environment 402*b* may provide at least part of an execution environment for web application client 406 received from web application 504. FIG. 4*c* illustrates an arrangement of components in FIG. 3 adapted to operate in a presentation subsystem of execution environment 402*c*. The arrangement in FIG. 4*c* may mediate communication between applications 404*c* and one or more presentation devices, such a display device exemplified by output device 130 in FIG. 1.

Figure 5:
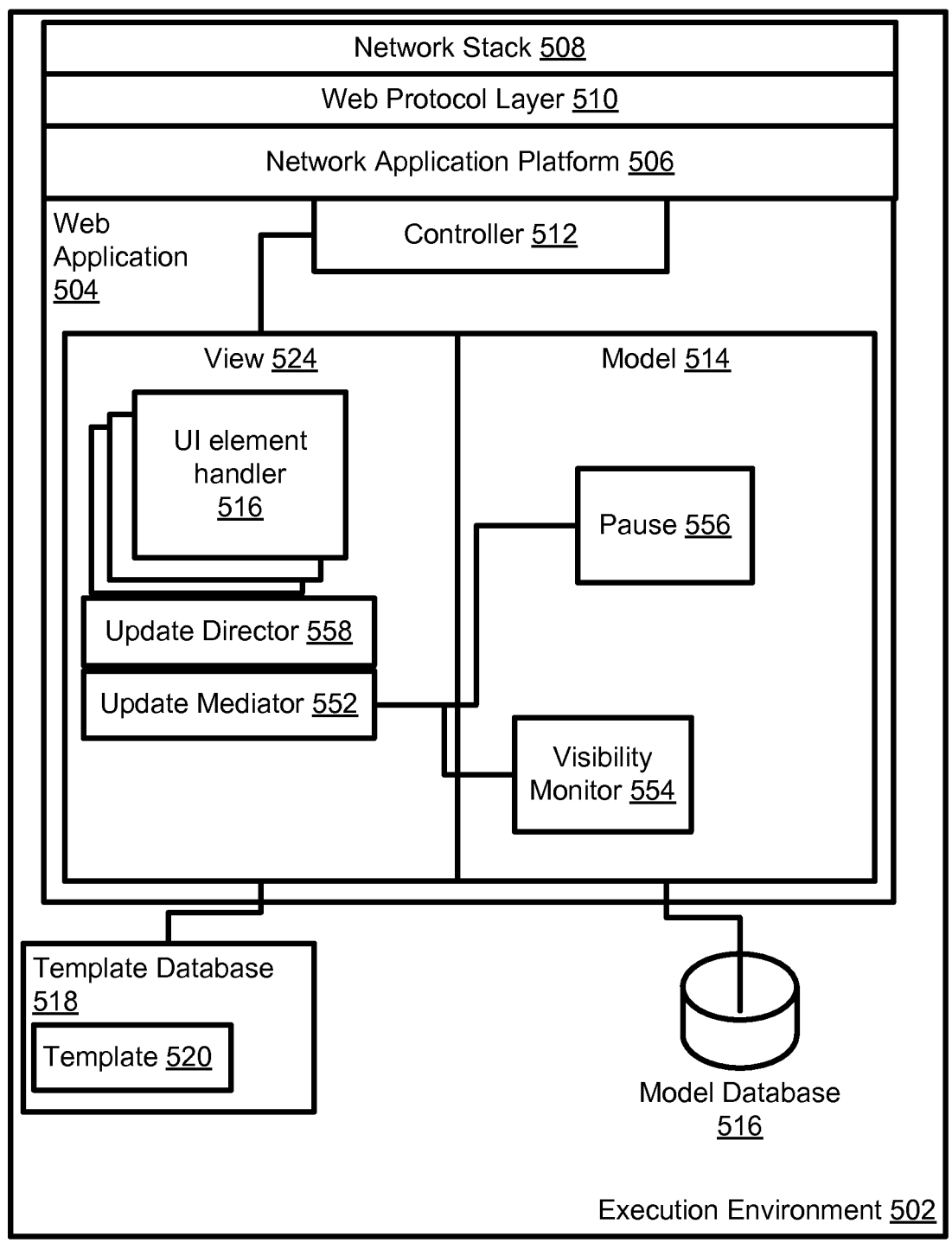
FIG. 5 is a block a diagram illustrating an arrangement of components for delaying presentation of an update to a user interface according to another aspect of the subject matter described herein.

FIG. 5 illustrates execution environment 502 configured to host a remote application provider illustrated by web application 504. Web application 504 includes yet another adaptation or analog of the arrangement of components in FIG. 3.

As stated the various adaptations described of the arrangement in FIG. 3 are not exhaustive. For example, those skilled in the art will see based on the description herein that arrangements of components for performing the method illustrated in FIG. 2 may be at least partially included in an application and at least partially external to the application. Further, arrangements for performing the method illustrated in FIG. 2 may be distributed across more than one node. For example, such an arrangement may operate at least partially in browser 404b in FIG. 4b. and at least partially in web application 504.

Adaptations of execution environment 402 as illustrated in FIG. 4a, FIG. 4b, and in FIG. 4c may include and/or otherwise be provided by a device such as user node 602 illustrated in FIG. 6. User node 602 may communicate with one or more application providers, such as network application platform 506 operating in execution environment 502. Execution environment 502 may include and/or otherwise be provided by application provider node 606 in FIG. 6. User node 602 and application provider node 606 may each include a network interface operatively coupling each respective node to network 604.

FIG. 4a, FIG. 4b, and FIG. 4c each illustrate a network stack 408 configured for sending and receiving messages over a network, such as the Internet, via a network interface of user node 602. FIG. 5 illustrates a network application platform 506 providing services to one or more web applications. Network application platform 506 may include and/or interoperate with a web server, in various aspects. FIG. 5 also illustrates network application platform 506 configured for interoperating with network stack 508. Network stack 508 serves a role analogous to network stacks 408 operating in various adaptations of execution environment 402.

Network stack 408 and network stack 508 may support the same protocol suite, such as TCP/IP, and/or may communicate via a network gateway or other protocol translation device and/or service. For example, browser 404b in FIG. 4b and network application platform 506 in FIG. 5 may interoperate via their respective network stacks; network stack 408b and network stack 508.

FIG. 4a, FIG. 4b, and FIG. 4c illustrate applications 404; and FIG. 5 illustrates web application 504, respectively, which may communicate via one or more application layer protocols. FIG. 4a, FIG. 4b, and FIG. 4c each illustrate an application protocol layer 410 exemplifying one or more application layer protocols. Exemplary application protocol layers include a hypertext transfer protocol (HTTP) layer and instant messaging and presence protocol, XMPP-IM layer. FIG. 5 illustrates a compatible application protocol layer as web protocol layer 510. Matching protocols enabling applications 404 supported by user node 602 to communicate with web application 504 of application provider node 606 via network 604 in FIG. 6 are not required if communication is via a protocol gateway or other translator.

In FIG. 4b, browser 404b may receive some or all of web application client 406 in one more messages sent from web application 504 via network application platform 506, a network stack, a network interface, and optionally an application protocol layer in each respective execution environment. In FIG. 4b, browser 404b includes content manager 412. Content manager 412 may interoperate with one or more of the application layer components 410b and/or network stack 408b to receive the message or messages including some or all of web application client 406.

Web application client 406 may include a web page for presenting a user interface for web application 504. The web page may include and/or reference data represented in one or more formats including hypertext markup language (HTML) and/or other markup language, ECMAScript or other scripting language, byte code, image data, audio data, and/or machine code.

In an example, in response to a request received from browser 404b, controller 512, in FIG. 5, may invoke model subsystem 514 to perform request specific processing. Model subsystem 514 may include any number of request processors for dynamically generating data and/or retrieving data from model database 516 based on the request. Controller 512 may further invoke one or more user interface (UI) element handlers 516 to identify one or more templates and/or static data elements for generating a user interface for representing a response to the received request. FIG. 5 illustrates template database 518 including an exemplary template 520. UI element handlers 516 illustrated in view subsystem 524 may return responses to processed requests in a presentation format suitable for a client, such as browser 404b. View subsystem 524 may provide the presentation data to controller 512 to send to browser 404b in response to the request received from browser 404b.

While the example above describes sending some or all of web application client 406, in response to a request, web application 504 additionally or alternatively, may send some or all of web application client 406 to browser 404b via one or more asynchronous messages. An asynchronous message may be sent in response to a change detected by web application 506. Publish-subscribe protocols, such as the presence protocol specified by XMPP-IM, are exemplary protocols for sending messages asynchronously.

The one or more messages including information representing some or all of web application client 406 may be received by content manager 412 via one or more of the application protocol layers 410b and/or network stack 408b as described above. In FIG. 4b, browser 404b includes one or more content handler components 414 to process received data according to its data type, typically identified by a MIME-type identifier. Exemplary content handler components 414 include a text/html content handler for processing HTML documents; an application/xmpp-xml content handler for processing XMPP streams including presence tuples, instant messages, and publish-subscribe data as defined by XMPP specifications; one or more video content handler components for processing video streams of various types; and still image data content handler components for processing various images types. Content handler components 414 process received data and may provide a representation of the processed data to one or more UI element handlers 416b.

UI element handlers 416 are illustrated in presentation controllers 418 in FIG. 4a, FIG. 4b, and FIG. 4c. Presentation controller 418 may manage the visual, audio, and other types of output of its including application 404 as well as receive and route detected user and other inputs to components and extensions of its including application 404. With respect to FIG. 4b, a UI element handler in various aspects may be adapted to operate at least partially in a content handler such as a text/html content handler and/or a script content handler. Additionally or alternatively, a UI element handlers in an execution environment may operate in an and/or as an extension of its including application, such as a plug-in providing a virtual machine for script and/or byte code; and/or external to an interoperating application.

Figure 7:
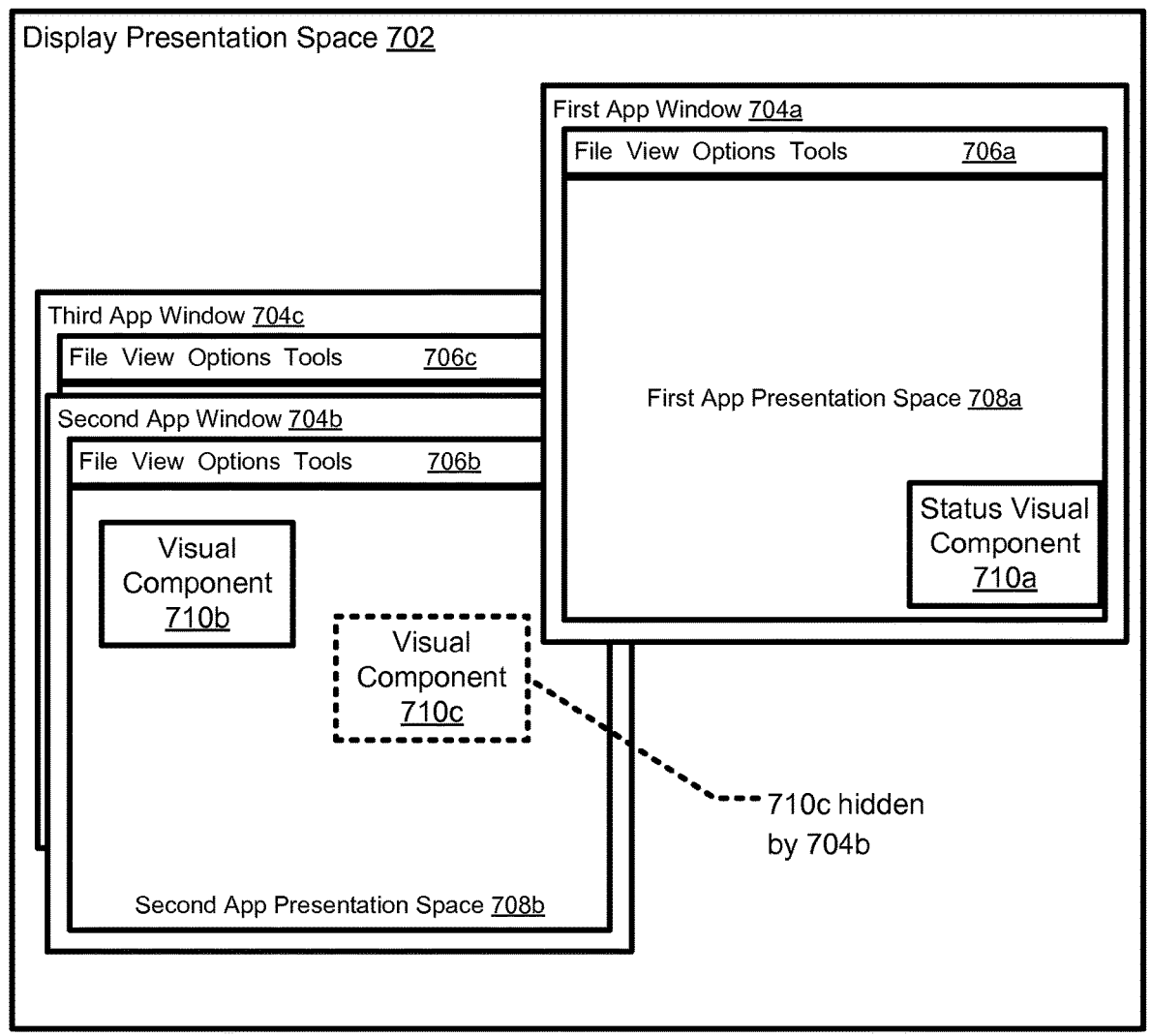
FIG. 7 is a diagram illustrating a user interface presented by a display according to an aspect of the subject matter described herein.

FIG. 7 illustrates a presentation space 702 of a display device including application windows 704 illustrating exemplary user interfaces of applications 404 operating in execution environments 402 in FIG. 4a, FIG. 4b, and FIG. 4c; and web application 504 in execution environment 502 in FIG.

5. In some contexts an execution environment 402 in a specific figure is referred to and in other contexts the user interfaces of applications 404 are described, for ease of illustration, as if the execution environments in FIG. 4a, FIG. 4b, and FIG. 4c are a single execution environment 402.

The visual components of a user interface are referred to herein as visual interface elements. A visual interface element may be a visual component of a graphical user interface (GUI). Exemplary visual interface elements include windows, textboxes, various types of button controls including check boxes and radio buttons, sliders, list boxes, drop-down lists, spin boxes, various types of menus, toolbars, ribbons, combo boxes, tree views, grid views, navigation tabs, scrollbars, labels, tooltips, text in various fonts, balloons, and dialog boxes. An application interface may include one or more of the exemplary elements listed. Those skilled in the art will understand that this list is not exhaustive. The terms visual representation, visual component, and visual interface element are used interchangeably in this document.

Other types of user interface components include audio output components referred to as audio interface elements, tactile output components referred to a tactile interface elements, and the like. Visual, audio, tactile, and other types of interface elements are generically referred to as user interface (UI) elements.

A user interface element handler component, as the term is used in this document, includes a component configured to send information representing a program entity for presenting a user detectable representation of the program entity by an output device. The representation is presented based on the sent information. The sent information is referred to herein as representation information. Types of UI element handlers correspond to various types and output and include visual interface (VI) element handler components, audio element handlers, and the like.

A program entity is an object included in and/or otherwise processed by an application or executable program component. A representation of a program entity may be represented and/or otherwise maintained in a presentation space.

Representation information includes data in one or more formats. Representation information for a visual representation may include data formatted according to an image format such as JPEG, a video format such as MP4, a markup language such as HTML and other XML-based markup, and/or instructions such as those defined by various script languages, byte code, and/or machine code. For example, a web page received by a browser from a remote application provider may include HTML ECMAScript, and/or byte code for presenting one or more UI elements included in a user interface of the remote application.

As used in this document, the term presentation space refers to a storage region allocated and/or otherwise provided for storing audio, visual, tactile, and/or other sensory data for presentation by and/or on a presentation device. For example a buffer for storing an image and/or text string may be a presentation space. A presentation space may be physically and/or logically contiguous or non-contiguous. A presentation space may have a virtual as well as a physical representation. A presentation space may include a storage location in IPU memory, secondary storage, a memory of a presentation adapter device, and/or a storage medium of a presentation device. A screen of a display, for example, is a presentation space.

Application windows 704, in FIG. 7, illustrate a number of visual components commonly found in application user interfaces. Application windows 704 include respective menu bars 706 with menu controls for identifying received user input as commands to perform. Application windows 704 also include respective UI elements providing respective presentation spaces 708 for presenting content including other visual components. Second App Window 704b may be a browser window presented by browser 404b in FIG. 4b. Second app window 704b may include a user interface of a web application provided by a remote node, such as web application 504 in FIG. 5, presented in second app presentation space 708b.

Various UI elements of applications 404 and web application 504 described above are presented by one or more UI element handlers 416, 516. In an aspect, illustrated in FIG. 4a, FIG. 4b, and in FIG. 4c, UI element handler(s) 416 of one or more applications 404 is/are configured to send representation information representing a visual interface element, such as menu bar 706 illustrated in FIG. 7, to GUI subsystem 420. GUI subsystem 420 may instruct graphics subsystem 422 to draw the visual interface element in a buffer of display adapter 426 to present the visual interface element in a region of display presentation space 702 in FIG. 7 of display 428, based on representation information received from the one or more corresponding UI element handlers 416.

Input may be received corresponding to a UI element via input driver 424. For example, a user may move a mouse to move a pointer presented in display presentation space 702 over an operation identified in menu bar 706. The user may provide an input detected by the mouse. The detected input may be received by GUI subsystem 420 via input driver 424 as an operation or command indicator based on the association of the shared location of the pointer and the operation identifier in display presentation space 702.

With reference to the method illustrated in FIG. 2, block 202 illustrates the method includes receiving first update information for sending to a display device to update a previously updated, existing visual component. Accordingly, a system for delaying presentation of an update to a user interface includes means for receiving first update information for sending to a display device to update a previously updated, existing visual component. For example, as illustrated in FIG. 3, the update mediator component 352 is configured for receiving first update information for sending to a display device to update a previously updated, existing visual component.

FIG. 4a-c illustrate update mediator components 452 as adaptations of and/or analogs of update mediator component 352 in FIG. 3. One or more update mediator components 452 operate in execution environment 402. In FIG. 4a, update mediator component 452a is illustrated as a component of presentation controller 418a included in application 404a. In FIG. 4b, update mediator component 452b is illustrated as component of web application client 406. In FIG. 4c, update mediator component 452c is illustrated operating external to one or more applications 404c. Execution environment 402c illustrates update mediator component 452c in GUI subsystem 420c. In FIG. 5, update mediator component 552 is illustrated operating in web application 504 remote from display device 428 for presenting received update information for updating a visual component. For example, update mediator component 552 may operate[[d]] in application provider node 606 while the received update information is to be sent to display device 428 of user node 602 via network 604.

An update mediator component 452, 552, as illustrated in FIG. 4a-c and FIG. 5 respectively, may be at least partially included in and/or otherwise configured to interoperate with a UI element handler 416, 516 to present update information received by sending the received update information as is and/or transformed to an output device, such as display device 428, for presenting to a user. The received update information may correspond to a previously presented and/or otherwise updated, existing visual component, such as any of the visual elements in FIG. 7 or a visual element presented in a presentation space 708 of a corresponding application 404, 504.

The received update information may represent any program entity of an application 404, 504. Program entities that the received update information may represent include one or more of a presence entity, a subscription, a software component, a hardware component, an organization, a user, a group, a role, an item for sale, a transaction, a path, a message, a slideshow, a media stream, a real world and/or virtual location, a measure of time, a measure of temperature, an output of a measuring device, and an output of a sensing device. For example, web application 504 may be a presence service. A component for receiving published update information from one or more presence entities may include or be included in update mediator component 552 to receive a presence tuple including update information.

In various aspects, an update mediator component 452 may receive update information from one or more components via one or more interoperation mechanisms. In one aspect illustrated in FIG. 4a, update mediator 452a may receive update information, for sending to presentation device, via interoperation with one or more application specific components of application 404a illustrated as application logic 426a. For example, update information for a status visual component 710a in FIG. 7 of user node 602 may be determined and/or otherwise identified by a system monitor component (not shown) included in application logic 426.

In another aspect, an application, such as browser 404b, in FIG. 4b, may be and/or may include a presence client component, such as web application client 406. Web application 504 may receive update information by update mediator component 552 in the presence tuple to send to display device 428b of user node 602 via application 404b and/or web application client 406 operating in execution environment 402b. In an aspect, the receiving presence client, application 404b and/or web application client 406, includes update mediator component 452b to receive the update information sent via the network to send to display device 428b to update a visual component, such as visual component 710b in second app presentation space 708b in FIG. 7.

In a further aspect, the received update information may be sent from an application for updating a visual component and intercepted. FIG. 4c illustrates update mediator component 452c in GUI subsystem 420c. When one or more applications 402c instruct GUI subsystem 420c to update a visual component, update mediator component 452c may receive the update information for updating visual component 710c of third app window 704c hidden by second app window 704b by intercepting some or all of the data.

In various aspects, update mediator 452 may be configured to receive update information for sending to a presentation device via one or more interoperation and/or communication mechanisms including an interprocess communication mechanism such as a pipe, message queue, a hardware interrupt, and/or a software interrupt; a message received via a network, for example, from a remote device; a detected user input; via a function call and/or other execution of a machine code branch instruction targeting update mediator component 452, 552 Update information received may be received in response to a request. For example, update mediator component 452a may poll the system status component.

Alternatively or additionally, the update information may be received asynchronously. For example, update mediator component 452a may receive system status update information for updating status visual component 710a via an IPU memory location accessible via a semaphore or other concurrency control. Analogously update mediator component 552 may receive update information via one or more messages sent asynchronously to web application provider 504.

A previously updated, existing UI element may be included in and/or include various types of UI elements. In FIG. 7, one or more of visual components 710, may include and/or be included in any one or more visual interface elements. Exemplary visual components include a window, textbox, a button, a check box, a radio button, a slider, a spin box, a list box, a drop-down list, a menu, a menu item, a toolbar, a ribbon, a combo box, a tree view, a grid view, a navigation tab, a scrollbar, a label, a tooltip, a balloon, and a dialog box.

In various aspects updating a previously updated, existing UI element may include adding, removing, and/or otherwise changing the existing UI element. For example, updating a visual component 710 may include adding another visual element to the existing visual component, removing a visual element from the existing visual component, and/or changing one or more of a color, font, size, location, a level of transparency, a text representation, and/or other visually detectable attribute of a visual element included in the visual component. For example, updating status visual component 710a, in an aspect, includes changing the color of some or all of status visual component 710a from yellow to green. In another aspect, updating status visual component 710a may include replacing an image representing a first status with an image representing a second status included in and/or otherwise identified by update information received by update mediator component 452a.

Returning to FIG. 2, block 204 illustrates the method further includes detecting that a specified visibility condition associated with the visual component is not met. Accordingly, a system for delaying presentation of an update to a user interface includes means for detecting that a specified visibility condition associated with the visual component is not met. For example, as illustrated in FIG. 3, the visibility monitor component 354 is configured for detecting that a specified visibility condition associated with the visual component is not met.

FIG. 4 illustrates visibility monitor component 454 as an adaptation of and/or analog of visibility monitor component 354 in FIG. 3. One or more visibility monitor components 454 operate in execution environment 402. Visibility monitor 454 detects, determines, and/or otherwise identifies whether an update of a UI element is and/or will be detectable by a user based on one or more visibility conditions. In FIG. 4a, visibility monitor component 454a is illustrated as a component of application 404a operatively coupled to update mediator component 452a. In FIG. 4b, visibility monitor component 454b is illustrated as a component of web application client 406 along with update mediator component 452b. In FIG. 4c, visibility monitor component 454c is illustrated operating external to one or more applications 404c. Execution environment 402c includes visibility monitor components 454c in its presentation subsystem in GUI subsystem 420c. In FIG. 5, visibility monitor component 554 is illustrated operating in web application 504 along with update mediator component 552.

In an aspect, in FIG. 4a visibility monitor component 454a may interoperate with one or more UI element handlers 416a for presenting status visual component 710a to request an input focus attribute. Visibility monitor component 454a may determine that status visual component 710a and/or a parent visual element of status visual component 710a does or does not have input focus. Input focus may provide an indication of a user's focus or awareness of an application. User attention to an application user interface is generally higher when the application or a component of the application has input focus. A visibility condition may be specified to require that a UI element have input focus. When status visual component 710a does not have input focus and/or when a parent visual element of status visual component 710a does not have input focus, visibility monitor component 454a may determine that the visibility condition is not met. Similarly, when status visual component 710a does have input focus and/or when a parent visual element of status visual component 710a has input focus, visibility monitor component 454a may determine that the visibility condition is met.

Various visibility criteria may be included in detecting and testing whether a visibility condition is met or not according to various aspects. While a visual component either has input focus or does not, other visibility conditions include multiple criteria represented by multiple discrete values and/or by a continuous range of values, such as produced by a continuous function. A visibility condition may be a measure of the visibility of a visual component to a user. A visibility condition may be based on, for example, a size of a visible and/or hidden visual component or portion of a visual component; a measure of transparency of the visual component and/or another visual component that overlays or is overlaid by the visual component; a z-order attribute of the visual component and/or relative z-order of the visual component to another visual component; a measure of readability of a text element included in the visual component, for example, based on font size and/or screen size; and/or a measure of user attention to and/or user awareness of the visual component, such as, an indication of user sight direction as detected by a gaze detector.

In FIG. 4a, visibility monitor component 454a may detect that a visibility criterion for measuring and/or otherwise indicating a user's attention to visual component 710a matches a specified value, meets a specified threshold, and/or is included within a specified range. The visibility condition may be based on an indication from a gaze detector indicating a direction of visual attention for a user. Visibility monitor component 454a may determine and/or otherwise detect that the visual component 710a is or is not within a specified range of the user's visual attention. Based on whether the visual component is or is not within the specified range, visibility monitor 454a may detect whether a visibility condition based on the gaze criteria is met or not met. For example, a gaze detector may indicate a user's eyes are closed or looking in direction other than display device 428a.

In FIG. 4b, visibility monitor component 454b may detect that visual component 710b and/or a parent visual element of visual component 710b has a z-order attribute indicating that it is not at the highest z-order level where higher z-order components are presented in front of relatively lower z-order visual components. Additionally or alternatively, z-order information for visual component 710b may be sent by browser 404b and/or web application client 406 via network 604 to visibility monitor component 554. Visibility monitor component 454b and visibility monitor component 554 may work together to detect that a visibility condition is not met when the z-order level is not the highest and is met otherwise.

Figure 8:
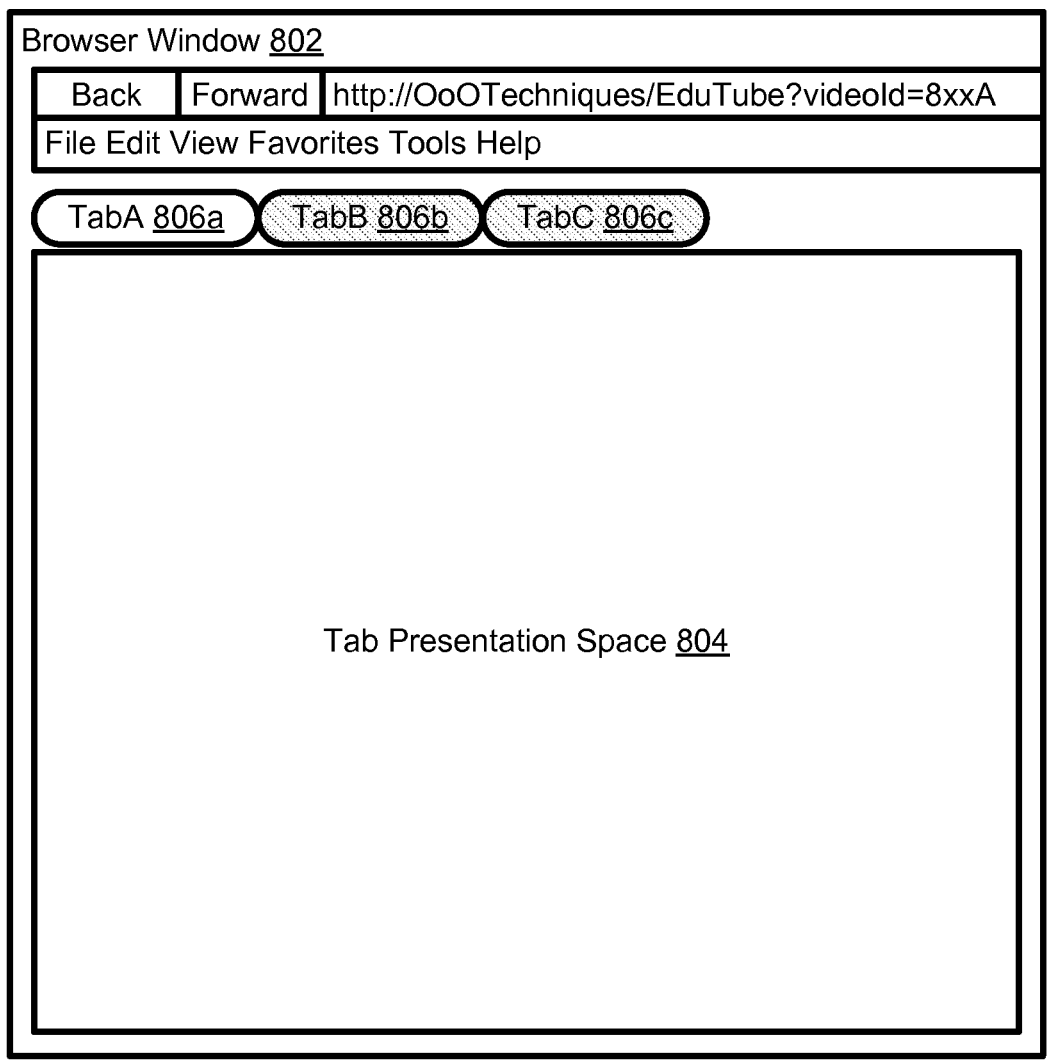
FIG. 8 is a diagram illustrating a user interface presented by a display according to an aspect of the subject matter described herein.

FIG. 8 illustrates browser window 802 as an alternative user interface for browser 404b, web application client 406, and/or web application 504. Visibility monitor component 454b and/or visibility monitor component 554 may detect that a visual component included in a tab presentation space 804 is in a tab with content currently hidden from a user, such as tabB 806b and tabC 808c; and may detect, in response, that a visibility condition associated with a visual component in tabB 806b and/or tabC 808c is not met based for a particular configuration of the visibility condition. Visibility monitor component 454b may determine that a visibility condition for a visual component in tabA 806a is met based on tabA 806a having a visible or top-most tab presentation space 804.

In FIG. 4c, visibility monitor component 454c may detect that a specified percentage of visual component 710c is not visible to a user and detect based on the determination that a specified visibility condition is not met. Otherwise, visibility monitor components 454c may detect the visibility condition is met when the specified percentage of visual component 710c is visible to the user. Alternatively or additionally, visibility monitor components 454c may detect a transparency level of second app presentation space 708b and/or a visual component included in second app presentation space 708b that overlays visual component 710c. Visibility monitor component 454c may detect that a current transparency level is below a configured threshold. When the transparency level is below the threshold, visibility monitor components 454c may detect that a configured visibility condition is not met. When the transparency level is determined to be at or above the threshold, visibility monitor components 454c may detect that the visibility condition is met.

Different criteria may be used to detect when a visibility condition is no longer met, when a visibility condition is initially met, and when a visibility condition indicates a current state for updating or not updating a visual component is to be maintained. That is, a visibility condition may include different criteria for detecting when the condition is met than the criteria used for determining when it is not met. Those skilled in the art will understand that some visibility conditions may have different and/or dynamic methods and/or criteria for detecting whether the other respective visibility conditions are met or not.

As described, a visibility condition may be represented by one or more values. In an aspect, some or all of a visibility condition may be represented by an expression, formula, and/or policy. A visibility condition may be specified by a user and/or contextual information may be specified identifying which visibility condition among a plurality is to be test. Visibility monitor component 454, 554 may calculate a formula, evaluate an expression, and/or respond to the rules of a policy in determining whether a visibility condition is met or not.

A visibility condition and/or the detecting for whether a visibility condition is met or not may be based on a particular application related to the visual component to be updated. In FIG. 4a, visibility monitor component 454a may detect whether a visibility condition is met or not only for the application 404a that includes it. A visibility condition and/or the detection of whether it is met or not may be based on a particular visual component and/or attribute of the visual component. In FIG. 4b, visibility monitor component 454b may detect a visibility condition that is different than visibility conditions for one or more other applications. Visibility monitor component 454b may detect a visibility condition based on color, for example, for visual component 710b and detect a visibility condition based on some other attribute for another visual component. In FIG. 4c, visibility monitor component 454c may detect a visibility condition based on the identity of a user of the device. The user's age and/or visual acuity may determine what visibility condition to use and/or when a visibility condition is met or not. A visibility condition and/or the detecting for whether the visibility condition is met or not may be based on one or more other attributes including a type of object represented; a type, size, and/or other attribute of display device 428; a group; a task being performed; a role of a user; a measure of time including a time of day, a measure of time a user has been using a device and/or performing one or more activities; and/or a detectable ambient condition associated with display device 428 such as brightness level.

In an aspect, a visibility monitor component may detect whether a visibility condition is met or not met in response to a change, that is visually detectable by a user, to a changed visual component presented by a display device. For example, In FIG. 4c, visibility monitor component 454c may be invoked to detect whether a visibility condition is met in response a change in the number of app windows 704 presented in display presentation space 702. In another aspect, In FIG. 5, web application 504 may receive a message from browser 404b and/or web application client 406 including information indicating a change in the z-level of visual component 710b which might a change in the attribute or a change relative to another visual component. Web application 504 may invoke visibility monitor component 554 to detect whether a visibility condition associated with visual component 710b is met or not, in response to the change in z-level.

In still another exemplary aspect, GUI subsystem 420c may detect that third app window 702c has been or is being resized in response to one or more user inputs. GUI subsystem 420c may interoperate with visibility monitor component 454c in response to the change in size to detect whether a visibility condition associated with visual component 710c is met or not met.

Other exemplary changes visually detectable by a user include a restoring of a visual component from a minimized state or maximized state, a change in input focus for a visual component, a change in a transparency attribute of a visual component, and/or a change in location of a visual component in a presentation space of a display device.

Returning to FIG. 2, block 206 illustrates the method yet further includes, in response to detecting the visibility condition is not met, deferring the sending. Accordingly, a system for delaying presentation of an update to a user interface includes means for, in response to detecting the visibility condition is not met, deferring the sending. For example, as illustrated in FIG. 3, a pause component 356 is configured for, in response to detecting the visibility condition is not met, deferring the sending.

FIG. 4 illustrates pause component 456 as an adaptation of and/or analog of pause component 356 in FIG. 3. One or more pause components 456 operate in execution environment 402. In response to visibility monitor component 454, pause component 456 defers sending the received update information to display device 428. In FIG. 4a, pause component 456a is illustrated as a component of application 404a operatively coupled to visibility monitor component 454a and update director component 458a. In FIG. 4b, pause component 456b is illustrated as component of web application client 406 operatively coupled to visibility monitor component 454b. In FIG. 4c, pause component 456c is illustrated operating external to one or more applications 404c. Execution environment 402c includes pause component 456c in its presentation subsystem. In FIG. 5, pause component 556 is illustrated operating in web application 504 along with update mediator component 552.

In various aspects, pause component 456 may cache or otherwise store the update information for sending later. The update information may be stored in one or more storage locations in IPU memory, a secondary data store, and/or a remote data store. In FIG. 4a, pause component 456a may store received update information for sending to display device 428a to update status visual component 710a in a portion of heap space allocated by application 404a in IPU memory 118. Pause component 456b may store received update information in a cache provided by browser 404b maintained in persistent secondary storage 108, such as a hard-drive. In FIG. 4c, pause component 456c may store received update information for updating visual component 710c in a buffer provided by graphics subsystem 422c. Pause component 556 may store receive update information in model database 516.

In other aspects, a pause component may prevent access to the update information and thus prevent sending the update information to a display device. In FIG. 4a, pause component 456a may request a semaphore in response to detecting that the visibility condition is not met. A thread or process including instructions for sending the update information to update visual component 710a in FIG. 7 may, as a result, be blocked or suspended due to the locked semaphore. The blocked thread prevents pause component 456a and/or some other component from interoperating with a UI element handler 416a for visual component 710a to send the received update information to display device 428a, thus deferring sending the received update information. In FIG. 4b, pause component 456b may wait on a message from web application 504 indicating the received data may be sent to display device 428b to update visual component 710b. In an aspect, pause component 456b may call browser 404b to store the received data. In FIG. 4c, pause component 456c may prevent GUI subsystem 420c from providing a presentation space for drawing a representation of visual component 710c for updating.

Deferring sending the update information by pause component 456 may include interoperation with a semaphore; a lock; a presentation space such as a display and/or audio buffer; a component of a user interface subsystem and/or library; a component of a UI element; a component of an audio subsystem and/or library; a display adapter and/or resource of a display adapter; a display device and/or resource of a display device; an audio adapter and/or resource of an audio adapter, an audio presentation device and/or resource of a audio presentation device; a tactile output subsystem and/or resource of a tactile output subsystem; a tactile output device and/or resource of a tactile output device; an access control component and/or resource of an access control component; a serialization component; and/or a resource of a serialization component; and/or a synchronization component and/or resource of a synchronization component.

In yet another aspect, a pause component may send one or messages to a sender of update information for sending to a display device. The message may include update information indicating and/or otherwise instructing the sender to defer sending additional update information for updating a visual component. The one or more messages may indicate and/or otherwise instruct the sender of the received update information to save or hold the update information until an indication and/or instruction is received by the sender to resend the update information for receiving a second time by the receiver. The indication may include a message from the receiver and/or the sender may resend the update information without receiving a request from the receiver. For example, pause component 456c in web application client 406 may send or otherwise provide for sending one or more messages for user node 602 to web application 502 in application provider node 606 instructing web application to cease sending additional update information for updating visual component 710c and/to save update information already sent for resending later. Pause component 556 may be included in performing the instruction(s) received via the one or more messages. For example, pause component 556 may provide for resending the update information based on a timer or some other event indicating the receiver is ready or the sender should otherwise resend the update information.

Returning to FIG. 2, block 208 illustrates the method additionally includes detecting the visibility condition is met. Accordingly, a system for delaying presentation of an update to a user interface includes means for detecting the visibility condition is met. For example, as illustrated in FIG. 3, a visibility monitor component 354 is configured for detecting the visibility condition is met.

As described above, FIG. 4a-c, and FIG. 5, respectively, illustrate visibility monitor component 454, 554 as adaptations of and/or analogs of visibility monitor component 354 in FIG. 3. Detecting a visibility condition is met by visibility monitor component 454, 554 is described above in the context of block 204 in FIG. 2 and is not repeated here.

Returning to FIG. 2, block 210 illustrates the method also includes, in response to detecting the visibility condition is met, performing the sending to update the visual component. Accordingly, a system for delaying presentation of an update to a user interface includes means for, in response to detecting the visibility condition is met, performing the sending to update the visual component. For example, as illustrated in FIG. 3, an update director component 358 is configured for, in response to detecting the visibility condition is met, performing the sending to update the visual component.

FIG. 4 illustrates update director component 458 as an adaptation of and/or analog of update director component 358 in FIG. 3. One or more update director components 458 operate in execution environment 402. In FIG. 4a, update director component 458a is illustrated as a component of application 404a operatively coupled to update mediator component 452a, pause component 456a, and a UI element handler 416a corresponding to visual component 710a to be updated. In FIG. 4b, update director component 458b is illustrated as component of web application client 406 operatively coupled to update mediator component 452b and a UI element handler 416b corresponding to visual component 710b. In FIG. 4c, update director component 458c is illustrated operating external to one or more applications 404c. In FIG. 5, update director component 558 is illustrated operating in view subsystem 524 mediating communication between a UI element handler 516 corresponding to visual component 710b, in an aspect. and update mediator component 551.

In various aspects, an update director component may send the update information to a display device indirectly via one or more other components including a networking component such as network stack 508. Additionally or alternatively, an adaption of update director component 358 may send update information to a display device via a direct coupling (not shown).

In FIG. 4a, FIG. 4b, and in FIG. 5, update director components 458a, 458b, 558 mediate communication between UI element handlers 416a, 416b, 516, respectively, corresponding to visual components to be updated. In FIG. 4c, update director component 458c mediates communication between a UI element handler 416c corresponding to a visual component to be updated and graphics subsystem 422c. It will be clear to those skilled in the art that, in various aspects, adaptations and/or analogs of update director component 358 may mediate and/or otherwise control communication between any components included in a path of execution for sending update information to a display device to update a previously updated, existing visual component.

Update director component 558 illustrates an update director component may operate in a node remote from a display device. Update director component 458a illustrates mediation and/or control may take place in an application owning the visual component. Update director component 458b illustrates mediation and/or control may be provided by a mobile component transferred from a server to a client. Those skilled in the art will recognize that functional analogs of update director component 358 may be provided in a distributed manner. For example, update director component 458b and update directory component 558 may cooperate in performing the portion of the method in FIG. 2 illustrated in block 208.

In an aspect, an update director component may send update information to update the visual component on a display device of a remote node by sending update information in and/or otherwise identified by one or more messages transmitted via a network to a node operatively coupled to the display device.

In FIG. 5, in response to detecting one or more visibility criteria is/are met by visibility monitor component 554 where the visibility condition/criteria is/are associated with visual component 710b sent by web application 504 to browser 404b in web application client 406, update director component 558 may provide and/or otherwise identify the update information received by update mediator component 552 and deferred by pause component 556 to the UI element handler 516 to process and send to browser 404b to send to display device 428b to update visual component 710b. Visibility monitor component 554 may detect the visibility condition is met in response to a request from browser 404b. The update information to send to display device 428b of user node 602 may be sent in a response message to the request.

Alternatively or additionally, visibility monitor component 554 may detect a visibility condition is met in response an event in execution environment 502 and/or based on a message from a node other than user node 602. The update information to send to display device 428 of user node 602 may be sent asynchronously to browser 404b in a message without a corresponding request. Browser 404b and/or web application client 406 may have an active subscription that directs the asynchronous message to browser 404b and/or web application client 406.

An adaption and/or analog of the arrangement of components in FIG. 3 may receive multiple instances of update information for updating a visual component and defer sending the received instances of update information while a visibility condition is not met. That is, in addition to receiving first update information to send to a display device to update a visual component, additional update information, second update information, may subsequently be received for updating the visual component. In response to detecting a visibility condition is not met, sending of the second update information to the display device may be deferred in addition to deferring sending of the first update information as described above. In response to detecting the visibility condition is met, the first update information may be sent for updating the visual component a first time and the second update information may be sent to the display device for updating the visual component a second time.

While the second update information is received after the first update information is received. The first update information may be sent to the display device subsequent to sending the second update information and vice versa. That is the first time may be before or after the second time. This allows a user to detect the updates in the order the update information was received by an update mediator component or to see them in reverse order from most recently received back to the oldest received update information. Those skilled in the art will see based on the descriptions herein that multiple instances of update information received for updating the visual component may be sent in any number of orderings, according to various aspects, to the display device for updating a visual component.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components can be added while still achieving the functionality described herein. Thus, the subject matter described herein can be embodied in many different variations, and all such variations are contemplated to be within the scope of what is claimed.

To facilitate an understanding of the subject matter described above, many aspects are described in terms of sequences of actions that can be performed by elements of a computer system. For example, it will be recognized that the various actions can be performed by specialized circuits or circuitry (e.g., discrete logic gates interconnected to perform a specialized function), by program instructions being executed by one or more instruction processing units, or by a combination of both. The description herein of any sequence of actions is not intended to imply that the specific order described for performing that sequence must be followed.

Moreover, the methods described herein can be embodied in executable instructions stored in a computer readable medium for use by or in connection with an instruction execution machine, system, apparatus, or device, such as a computer-based or processor-containing machine, system, apparatus, or device. As used here, a "computer readable medium" can include one or more of any suitable media for storing the executable instructions of a computer program in one or more of an electronic, magnetic, optical, electromagnetic, and infrared form, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), a Blu-Ray™ disc; and the like.

Thus, the subject matter described herein can be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating any non-claimed element is essential to the practice of the subject matter as claimed.

I claim:

1. An apparatus, comprising:
means for detecting that a visibility condition associated with a visual component of a graphical user interface of a single application that includes at least a portion of a media stream is not met, where the visibility condition associated with the visual component of the graphical user interface is detected as not being met in the event that at least a portion of the visual component of the graphical user interface is invisible based on a change in a size of an area in which the at least portion of the visual component of the graphical user interface is displayed, and further where the change in the size of the area is changed in response to user input on the graphical user interface of the single application that changes the location of the at least the portion of the media stream in the graphical user interface of the single application; and further for detecting that the visibility condition is met; and
means for, in the event that the visibility condition is not met, automatically avoiding sending update information associated with the media stream to a display device to avoid an update of the visual component of the graphical user interface that includes the at least portion of the media stream, where the avoiding the sending of the update information associated with the media stream results in the at least portion of the media stream not being played; and further for, in the event that the visibility condition is met, automatically sending the update information associated with the media stream to the display device to update the visual component of the graphical user interface that includes the at least portion of the media stream, where the sending of the update information associated with the media stream results in the at least portion of the media stream being played.

2. An apparatus, comprising:
a touchscreen;
a non-transitory memory storing instructions; and
circuitry in communication with the touchscreen and the non-transitory memory, wherein the apparatus is configured to:

detect that a visibility condition associated with a visual component of a graphical user interface of a single application that includes at least a portion of a media stream is not met, where the visibility condition associated with the visual component of the graphical user interface is detected as not being met in the event that at least a portion of the visual component of the graphical user interface is invisible based on a change in a size of an area in which the at least portion of the visual component of the graphical user interface is displayed, and further where the change in the size of the area is changed in response to user input on the graphical user interface of the single application that changes the location of the at least the portion of the media stream in the graphical user interface of the single application;

in the event that the visibility condition is not met, automatically avoid sending update information associated with the media stream to the touchscreen to avoid an update of the visual component of the graphical user interface that includes the at least portion of the media stream, where the avoiding the sending of the update information associated with the media stream results in the at least portion of the media stream not being played;

detect that the visibility condition is met; and in the event that the visibility condition is met, automatically send the update information associated with the media stream to the touchscreen to update the visual component of the graphical user interface that includes the at least portion of the media stream, where the sending of the update information associated with the media stream results in the at least portion of the media stream being played.

3. The apparatus of claim 2, wherein the apparatus is configured such that the update information is retrieved over a network before the detection that the visibility condition is met.

4. The apparatus of claim 2, wherein the apparatus is configured such that the update information is retrieved over a network in response to the detection that the visibility condition is met.

5. The apparatus of claim 2, wherein the update information is received over a network before the detection that the visibility condition is not met.

6. The apparatus of claim 2, wherein the apparatus is configured such that, prior to the detection that visibility condition is met, the visual component of the graphical user interface that includes the at least portion of the media stream, includes a single image of the at least portion of the media stream.

7. The apparatus of claim 2, wherein the apparatus is configured such that the visibility condition associated with the visual component of the graphical user interface is detected as not being met in the event that only part of the visual component of the graphical user interface is invisible.

8. The apparatus of claim 2, wherein the apparatus is configured such that the detection that the visibility condition is met occurs prior to the detection that the visibility condition is not met, and where the visibility condition associated with the visual component of the graphical user interface is detected as not being met in the event that the at least the portion of the visual component of the graphical user interface is invisible based on a change in the size of the area in which the at least portion of the visual component of the graphical user interface is displayed.

9. The apparatus of claim 2, wherein the apparatus is configured such that the visibility condition associated with the visual component of the graphical user interface is detected as not being met in response to the area being scrolled until the at least portion of the visual component of the graphical user interface becomes invisible.

10. The apparatus of claim 2, wherein the apparatus is configured such that the at least portion of the media stream is not played, by being stopped.

11. The apparatus of claim 2, wherein the apparatus is configured such that the sending the update information in the event that the visibility condition is met, is conditionally performed based on a user configuration.

12. The apparatus of claim 2, wherein the apparatus is configured such that:
the detection that the visibility condition is met occurs prior to the detection that the visibility condition is not met; and
an additional detection that the visibility condition is met occurs after the detection that the visibility condition is not met, such that, in response to the additional detection that the visibility condition is met, the update information associated with the media stream is again sent to the touchscreen to update the visual component of the graphical user interface that includes the at least portion of the media stream.

13. The apparatus of claim 2, wherein the apparatus is configured such that:
the detection that the visibility condition is not met occurs prior to the detection that the visibility condition is met; and
an additional detection that the visibility condition is not met occurs after the detection that the visibility condition is met, such that, in response to the additional detection that the visibility condition is not met, sending of the update information associated with the media stream to the touchscreen is avoided to avoid further update of the visual component of the graphical user interface that includes the at least portion of the media stream.

14. The apparatus of claim 2, wherein the apparatus is configured such that the visual component of the graphical user interface includes a window of the single application, the single application including at least one media player.

15. The apparatus of claim 2, wherein the apparatus is configured such that the graphical user interface includes at least a portion of a plurality of media streams, and particular update information associated with a corresponding one of the plurality of media streams is sent to the touchscreen based on a detection that the visibility condition is met with respect to the corresponding one of the plurality of media streams.

16. The apparatus of claim 15, wherein the apparatus is configured such that the particular update information is sent in connection with only a single one of the plurality of media streams, at a time.

17. The apparatus of claim 2, wherein the apparatus is configured such that:
the visibility condition associated with the visual component of the graphical user interface is detected as not being met in the event that the at least the portion of the visual component of the graphical user interface is invisible based on a change in the size of the area in which the at least portion of the visual component of the graphical user interface is displayed;
the graphical user interface includes at least a portion of a plurality of media streams, and particular update information associated with a corresponding one of the plurality of media streams is sent to the touchscreen based on a detection that the visibility condition is met with respect to the corresponding one of the plurality of media streams, where the particular update information is sent in connection with only a single one of the plurality of media streams, at a time; and the sending the update information in the event that the visibility condition is met, is conditionally performed based on a user configuration.

18. The apparatus of claim 17, wherein the apparatus is configured such that the visibility condition associated with the visual component of the graphical user interface is detected as not being met in response to the area being scrolled until the at least portion of the visual component of the graphical user interface that includes the at least portion of the media stream becomes invisible.

19. The apparatus of claim 17, wherein the apparatus is configured such that:
the detection that the visibility condition is met occurs prior to the detection that the visibility condition is not met; and
an additional detection that the visibility condition is met occurs after the detection that the visibility condition is not met, such that, in response to the additional detection that the visibility condition is met, the update information associated with the media stream is again sent to the touchscreen to update the visual component of the graphical user interface that includes the at least portion of the media stream.

20. The apparatus of claim 17, wherein the apparatus is configured such that:
the detection that the visibility condition is not met occurs prior to the detection that the visibility condition is met; and
an additional detection that the visibility condition is not met occurs after the detection that the visibility condition is met, such that, in response to the additional detection that the visibility condition is not met, sending of the update information associated with the media stream to the touchscreen is avoided to avoid further update of the visual component of the graphical user interface that includes the at least portion of the media stream.

21. The apparatus of claim 17, wherein the apparatus is configured such that the update information is retrieved over a network before the detection that the visibility condition is met.

22. The apparatus of claim 17, wherein the apparatus is configured such that the update information is retrieved over a network in response to the detection that the visibility condition is met.

23. The apparatus of claim 17, wherein the update information is received over a network before the detection that the visibility condition is not met.

24. The apparatus of claim 17, wherein the apparatus is configured such that, prior to the detection that visibility condition is met, the visual component of the graphical user interface that includes the at least portion of the media stream, includes a single image of the at least portion of the media stream.

25. The apparatus of claim 2, wherein at least one of:
the update information is received over a network;
the update information is received from memory of the apparatus;
the update information that is sent in the event that the visibility condition is met, is different from the update information that is avoided from being sent in the event that the visibility condition is not met;
the update information that is sent in the event that the visibility condition is met, is the same as the update information that is avoided from being sent in the event that the visibility condition is not met;
the update information that is sent in the event that the visibility condition is met, and the update information that is avoided from being sent in the event that the visibility condition, are mutually exclusive;
the update information that is sent in the event that the visibility condition is met, and the update information that is avoided from being sent in the event that the visibility condition, have at least a portion of overlap;
the graphical user interface includes a software the graphical user interface;
the detection that the visibility condition associated with the visual component of the graphical user interface is met, occurs before the detection that the visibility condition associated with the visual component of the graphical user interface is not met;
the detection that the visibility condition associated with the visual component of the graphical user interface is not met, occurs before the detection that the visibility condition associated with the visual component of the graphical user interface is met;
the avoiding the sending of the update information includes avoiding the sending of the update information until the media stream is restarted;
the avoiding the sending of the update information includes avoiding the sending of the update information until the media stream is restarted, where the restarting includes sending other update information before the update information is sent;
the avoiding the sending of the update information includes avoiding the sending of the update information until the media stream is continued;
the avoiding includes deferring;
the avoiding includes a temporary avoiding;
the update information is associated with the at least portion of the media stream, by including the at least portion of the media stream;
the update information is associated with the at least portion of the media stream, by including content that can be processed so as to take the form of the at least portion of the media stream;
the update information is associated with an entirety of the media stream;
the update information is associated with only part of the media stream;
the visual component of the graphical user interface is updated by being supplemented;
the visual component of the graphical user interface is updated by being replaced;
the visual component of the graphical user interface is updated by continuing to play the at least portion of the media stream;
the visual component of the graphical user interface is updated by initiating a play of the at least portion of the media stream;
the visual component includes a window in which the at least portion of the media stream is included;
the visual component includes a window in which the at least portion of the media stream is played;
the area includes a portion of a presentation space of the touchscreen;
the area includes a portion of the graphical user interface;

the area in which the at least portion of the media stream is displayed, is capable of being changed by a user;

the area in which the at least portion of the media stream is displayed, is capable of being changed by a user in response to a detection of a scrolling action of the user that moves the area to be moved outside a presentation space of the touchscreen;

the area in which the at least portion of the media stream is displayed, is capable of being changed by a user in response to a detection of a browsing action of the user that causes the area to be moved outside a presentation space associated with the touchscreen;

the area in which the at least portion of the media stream is displayed, is capable of being changed by a user in response to a detection of a scrolling action of the user that causes the area to be moved outside a presentation space associated with the touchscreen;

the area in which the at least portion of the media stream is displayed, is capable of being changed by a user in response to a detection of a scrolling action of the user that causes the visual component to be moved outside a presentation space associated with the touchscreen;

the area in which the at least portion of the media stream is displayed, is capable of being changed by a user in response to a detection of a scrolling action of the user that causes the area to be moved outside the graphical user interface;

the area in which the at least portion of the media stream is displayed, is capable of being changed by a user in response to a detection of a scrolling action of the user that causes the visual component to be moved outside the graphical user interface;

the area in which the at least portion of the media stream is displayed, is capable of being changed by a user in response to a detection of a scrolling action of the user that causes the area to be moved outside a scope of the graphical user interface;

the area in which the at least portion of the media stream is displayed, is capable of being changed by a user in response to a detection of a scrolling action of the user that causes the visual component to be moved outside a scope of the graphical user interface;

the area in which the at least portion of the media stream is displayed, is capable of being changed by a user in response to a detection of a scrolling action of the user caused by the user scrolling an interface via a touchscreen;

the visibility condition associated with the visual component of the graphical user interface is detected as not being met in the event that the at least portion of the visual component of the graphical user interface is invisible, by detecting how much of the at least portion of the visual component of the graphical user interface is visible;

the visibility condition associated with the visual component of the graphical user interface is detected as not being met in the event that the at least portion of the visual component of the graphical user interface is invisible, by detecting how much of the at least portion of the visual component of the graphical user interface is invisible;

the visibility condition associated with the visual component of the graphical user interface is detected as not being met in the event that the at least portion of the visual component of the graphical user interface is invisible, by detecting a location of the at least portion of the visual component in the graphical user interface;

the visibility condition associated with the visual component of the graphical user interface is detected as not being met in the event that the at least portion of the visual component of the graphical user interface is invisible, by detecting a location of the at least portion of the visual component in a presentation space of the touchscreen;

the at least portion of the media stream includes only a part of the media stream;

the at least portion of the media stream is not played by being paused;

the at least portion of the media stream is not played by being stopped;

the at least portion of the media stream includes an entirety of the media stream;

the at least portion of the media stream that is included in the visual component when the visibility condition is met is the same as the at least portion of the media stream that is included in the visual component when the visibility condition is not met;

the at least portion of the media stream that is included in the visual component when the visibility condition is met is different from the at least portion of the media stream that is included in the visual component when the visibility condition is not met;

a first part of the at least portion of the media stream that is included in the visual component when the visibility condition is met is the same as a second part of the at least portion of the media stream that is included in the visual component when the visibility condition is not met;

a first part of the at least portion of the media stream that is included in the visual component when the visibility condition is met is different from a second part of the at least portion of the media stream that is included in the visual component when the visibility condition is not met;

the at least portion of the media stream that is played is the same as the at least portion of the media stream that is not played when the visibility condition is not met;

the at least portion of the media stream that is played is different from the at least portion of the media stream that is not played when the visibility condition is not met;

a first part of the at least portion of the media stream that is played when the visibility condition is met is the same as a second part of the at least portion of the media stream that is not played when the visibility condition is not met;

a first part of the at least portion of the media stream that is played when the visibility condition is met is different from a second part of the at least portion of the media stream that is not played when the visibility condition is not met;

the at least portion of the visual component of the graphical user interface includes an entirety of the visual component of the graphical user interface;

the at least portion of the visual component of the graphical user interface includes only part of the visual component of the graphical user interface;

the at least portion of the visual component of the graphical user interface is invisible as a result of the at least portion of the visual component residing outside a presentation space of the touchscreen;

the at least portion of the visual component of the graphical user interface is invisible as a result of the at least portion of the visual component no longer being within a presentation space of the touchscreen;

the at least portion of the visual component of the graphical user interface is invisible as a result of the at least portion of the visual component no longer being within the graphical user interface;

the at least portion of the visual component of the graphical user interface is invisible based on the size of the area, by the size of the area being reduced;

the at least portion of the visual component of the graphical user interface is invisible based on the size of the area, by the size of the area being reduced, so as to be no longer be within a presentation space of the touchscreen;

the at least portion of the visual component of the graphical user interface is invisible based on the size of the area, by the size of the area being reduced, so as to no longer be within the graphical user interface;

the at least portion of the visual component of the graphical user interface is invisible based on the size of the area, by the size of the area being enlarged insufficiently;

the at least portion of the visual component of the graphical user interface is invisible based on the size of the area, by the size of the area being enlarged insufficiently, so as to not yet be sufficiently within a presentation space of the touchscreen;

the at least portion of the visual component of the graphical user interface is invisible based on the size of the area, by the size of the area being enlarged insufficiently, so as to not yet be within the graphical user interface;

the at least portion of the visual component of the graphical user interface is invisible based on the size of the area not surpassing a threshold size;

the at least portion of the visual component of the graphical user interface is invisible based on the size of the area, by the area not extending to a threshold location on the graphical user interface;

the avoiding the sending includes an access to at least one of a semaphore; a lock; a presentation space; a component of a presentation subsystem; a component of a user interface element; a display adapter; a touchscreen, an audio adapter; an audio presentation device; a tactile output subsystem; a tactile output device and/or resource of a tactile output device; an access control component; a serialization component; or a synchronization component;

the avoiding the sending includes storing the update information in a storage location included in at least one of an instruction processing unit (IPU) memory or a persistent secondary data store;

the visibility condition is based on at least one of a resizing of a changed visual component, a restoring of the changed visual component from a minimized state, an assigning input focus to the changed visual component, a removing input focus from the changed visual component, a change in a z-order attribute of the change visual component, a change in a transparency attribute of the changed visual component, a change in a count of visible visual components including the changed visual component presented by the touchscreen, and change in location of the changed visual component in a presentation space of the touchscreen; or the visibility condition is based on at least one of an application presenting the visual component, an attribute of the touchscreen, a user, a group, a task, a role, a measure of time, an attribute of the visual component, and a detectable ambient condition;

the visibility condition is based on at least a portion of at least one of a size of a visible and hidden visual component, a measure of transparency of at least one of the visual component and another visual component overlaying at least a portion of the visual component, a z-order attribute, a measure of readability of a text element included in the visual component, and a measure of user awareness of the visual component;

the circuitry includes a processor;

the circuitry includes a processor including at least one of a microprocessor, a digital signal processor, a graphics processing unit, an application-specific integrated circuit (ASIC), or a field programmable gate array (FPGA);

the apparatus includes a processor;

the apparatus includes a processor including at least one of a microprocessor, a digital signal processor, a graphics processing unit, an application-specific integrated circuit (ASIC), or a field programmable gate array (FPGA);

the updating includes at least one of adding a visual element to the visual component, removing a visual element from the visual component, or changing at least one of a color, font, size, location, transparency, text representation, or a visually detectable attribute of a visual element included in the visual component; or the visual component at least one of includes or is included in at least of a window, a textbox, a button, a check box, a radio button, a slider, a spin box, a list box, a drop-down list, a menu, a menu item, a toolbar, a ribbon, a combo box, a tree view, a grid view, a navigation tab, a scrollbar, a label, a tooltip, a balloon, and a dialog box.

26. A computer program product comprising computer executable instructions stored on a non-transitory computer readable medium that, when used by an apparatus, causes the apparatus to:

detect that a visibility condition associated with a visual component of a graphical user interface of a single application that includes at least a portion of a media stream is not met, where the visibility condition associated with the visual component of the graphical user interface is detected as not being met in the event that at least a portion of the visual component of the graphical user interface is invisible based on a change in a size of an area in which the at least portion of the visual component of the graphical user interface is displayed, and further where the change in the size of the area is changed in response to user input on the graphical user interface of the single application that changes the location of the at least the portion of the media stream in the graphical user interface of the single application;

in the event that the visibility condition is not met, automatically avoid sending update information associated with the media stream to a display device to avoid an update of the visual component of the graphical user interface that includes the at least portion of the media stream, where the avoiding the sending of the update information associated with the media stream results in the at least portion of the media stream not being played via the visual component of the graphical user interface;

detect that the visibility condition is met; and in the event that the visibility condition is met, automatically send the update information associated with the media stream to the display device to update the visual component of the graphical user interface that includes the at least portion of the media stream, where the sending of the update information associated with the media stream results in the at least portion of the media stream being played via the visual component of the graphical user interface.

27. The computer program product of claim 26, wherein the computer executable instructions, when used by the apparatus, causes the apparatus to operate such that the avoiding the sending of the update information associated with the media stream results in the at least portion of the media stream not being played via the visual component of the graphical user interface by being played via another visual component, and the at least portion of the media stream is again played via the visual component of the graphical user interface, in response to detecting that the visibility condition is met, after detecting that the visibility condition is not met.

28. The computer program product of claim 26, wherein the instructions are part of a web page.

29. The computer program product of claim 28, wherein the computer executable instructions, when used by the apparatus, causes the apparatus to operate such that the visibility condition associated with the visual component of the graphical user interface is detected as not being met in the event that the at least the portion of the visual component of the graphical user interface is invisible based on a change in the size of the area in which the at least portion of the visual component of the graphical user interface is displayed, and the change in the size of the area is detected in response to a detection of a user browsing the web page.

30. The computer program product of claim 29, wherein the computer executable instructions, when used by the apparatus, causes the apparatus to operate such that the avoiding the sending of the update information associated with the media stream results in the at least portion of the media stream not being played via the visual component of the graphical user interface by being played via another visual component, and the at least portion of the media stream is again played via the visual component of the graphical user interface, in response to detecting that the visibility condition is met, after detecting that the visibility condition is not met.

31. The apparatus of claim 2, wherein the apparatus is configured such that the change in the size of the area is changed in response to the user input being on the media stream.

32. The apparatus of claim 2, wherein the apparatus is configured such that the change in the size of the area is changed in response to the user input being on a media player interface element that displays the media stream.

* * * * *